США012015259B2

(12) United States Patent
Babinot et al.

(10) Patent No.: US 12,015,259 B2
(45) Date of Patent: Jun. 18, 2024

(54) LAMINATED BUSBAR FOR ENERGY STORAGE DEVICE

(71) Applicant: MERSEN France Angers SAS, Verrieres-en-Anjou (FR)

(72) Inventors: Maxime Babinot, Rives du Loir en Anjou (FR); Florian Charles, Angers (FR); Thomas Fouet, Ornans (FR); Simon Dario, Verrieres en Anjou (FR)

(73) Assignee: MERSEN FRANCE ANGERS SAS, St Sylvain-d'Anjou (FR)

( * ) Notice: Subject to any disclaimer, the term of this patent is extended or adjusted under 35 U.S.C. 154(b) by 231 days.

(21) Appl. No.: 17/737,775

(22) Filed: May 5, 2022

(65) Prior Publication Data

US 2022/0360064 A1  Nov. 10, 2022

(30) Foreign Application Priority Data

May 6, 2021 (EP) .................................... 21305589

(51) Int. Cl.
*H02G 5/00* (2006.01)
*H01M 50/176* (2021.01)
*H01M 50/505* (2021.01)
*H01M 50/516* (2021.01)
*H01M 50/526* (2021.01)

(52) U.S. Cl.
CPC .......... *H02G 5/005* (2013.01); *H01M 50/176* (2021.01); *H01M 50/505* (2021.01); *H01M 50/516* (2021.01); *H01M 50/526* (2021.01)

(58) Field of Classification Search
CPC ....... H02G 5/00; H02G 5/005; H01M 50/516; H01M 50/176; H01M 50/505; H01M 50/526

USPC ....................................................... 174/99 B
See application file for complete search history.

(56) References Cited

U.S. PATENT DOCUMENTS

2016/0073506 A1  3/2016 Coakley et al.

FOREIGN PATENT DOCUMENTS

DE  202013012897 U1  4/2021

OTHER PUBLICATIONS

European Patent Application No. 21305589.0, Extended Search Report dated Nov. 29, 2021, 5 pages.

*Primary Examiner* — Tremesha S Willis
(74) *Attorney, Agent, or Firm* — Pearne & Gordon LLP (57) ABSTRACT

In a module from an electrical battery, a laminated busbar interconnects prismatic electrical cells that are configured to be arranged in cell groups of the same number of cells. The busbar comprises:
a first electrically conductive layer, with at least one electrically conducting element, each configured to connect electric poles of two adjacent cell groups,
a first electrically insulating layer, laminated on the first conductive layer,
a first electrical connector, configured to be connected to a first cell group,
a second electrically conductive layer laminated onto the first insulating layer and comprising a second electrical connector to be connected to a last cell group, and
a third electrical connector located closer to the first electrical connector than to the second electrical connector.

The first insulating layer comprises a cut-out window, configured to allow electrical connection of the second electrical connector with the last cell group.

13 Claims, 9 Drawing Sheets

LAMINATED BUSBAR FOR ENERGY STORAGE DEVICE

This application claims priority to European Application No. 21305589.0, filed May 6, 2021. The entire disclosure of the afore-mentioned patent application is incorporated herein by reference.

The present invention relates generally to a laminated busbar for interconnecting a pack of prismatic cells in an electrical battery, and to a module for an electrical battery comprising such a pack and busbar.

Electrical energy storage systems, or electrical batteries, are used in a variety of contexts, and battery packs are a core component of such systems. For example, a stationary electrical storage system can include battery packs for storing energy generated from solar panels. Electrical storage systems can also be used in mobile applications, such as electric vehicles. A basic unit of an electrical storage system is an electrical cell, which comes in several shapes. Cells can be of three common types: pouch, prismatic or cylindrical.

A cell has a given voltage and electrical energy storage capacity, depending on the technology and size of the cell. Therefore, for many applications, individual cells have to be connected together using a busbar in order to build energy storage systems capable of storing and delivering more power than a single battery cell. Energy storage systems include therefore modules, each module comprising multiple cells assembled together to form a pack of cells, also simply called "pack" in short. Different types of busbars are used for connecting modules within an electrical battery, and for connecting cells from the same pack within a module.

Among the existing various types of cells, prismatic cells are widely used today due to their ease of manufacturing and handling. Each cell has a prismatic shape with two accessible electrical poles placed on their upper face. The two electrical poles include a positive pole and a negative pole. The upper face has usually a rectangular shape, with two short sides and two long sides, each electrical pole being arranged next to a respective short side. Within a module, several prismatic cells are usually arranged together so that their upper face are all oriented in the same direction and are stacked along their long side, forming a row of electrical cells.

The busbar is configured to electrically connect all the cells of a row in series and parallel, as required by the design of the module.

Such a prismatic cell interconnection busbar is an important component of a battery module. In order to reduce the global cost of a battery pack, the busbar must be easy to produce, and easy to connect due to the large number of individual battery cells that have to be connected. Conventional busbar for battery interconnection employs both laminated busbar and/or non-laminated assemblies.

US-A1-2016073506 describes several designs of laminated busbar, with a conductive layer laminated onto an insulating layer. However the return circuit must be arranged separately, which is costly and time consuming.

There is therefore a need for improved busbar for the interconnection of prismatic electrical cells.

To this end, aspects of the invention pertains to a laminated busbar for interconnecting a pack of prismatic electrical cells in a module from an electrical battery, wherein:
the laminated busbar has an elongated and flat shape that extends along a main axis and in a median plane,
the pack of electrical cells is configured so that:
the electrical cells are configured to be arranged in a row along the main axis,
each cell has an upper side with two electric poles having opposite polarities and being arranged on opposite sides of a longitudinal plane, which is parallel to the main axis and orthogonal to the median plane, the electric poles of each cell being arranged in the median plane, with the upper side of each cell being oriented in the same direction,
the cells are arranged in at least two groups, with the same number of electrical cells in each group, with a first group of cells and a last group of cells located at opposite ends of the pack,
within the same group of cells, the electric poles having the same polarity are arranged on the same side of the longitudinal plane,
for two adjacent groups of cells, the electric poles having the same polarity are arranged on opposite sides of the longitudinal plane,
the laminated busbar comprises:
a first electrically conductive layer, comprising at least one electrically conducting element, each conducting element being configured to electrically connect the electric poles of two adjacent groups of cells, said electric poles being located on the same side of the longitudinal plane,
a first electrically insulating layer, which is laminated on the first conductive layer,
a first electrical connector, configured to be connected to the electric poles of the first group of cells whose electric poles are not connected to a conducting element of the first conductive layer.

According to the invention:
the laminated busbar further comprises a second electrically conductive layer, which extends along the main axis and comprises two opposite extremities with respectively a second electrical connector and a third electrical connector,
the second conductive layer is laminated onto the first insulating layer and electrically separated from the first conductive layer by the first insulating layer, the first conductive layer being sandwiched between the first insulating layer and the electric poles when the laminated busbar is connected to the pack of cells,
the second electrical connector is configured to be connected to the electric poles of the last group of cells, whose electric poles are not connected to a conducting element of the first conductive layer, while the third electrical connector is closer to the first electrical connector than the second electrical connector,
the first insulating layer comprises a cut-out window, configured to allow the electrical connection of the second electrical connector with the corresponding electric poles of the last group of cells.

The busbar in accordance with the invention is advantageous in that it is optimized for a rapid assembly to the busbar to the module of electrical cells. Because the first connector and the third connector are readily available to connect the module of electrical cells with other modules, only one busbar is required for the interconnection of the module's cells, which is efficient and economic. Thanks to its laminated structure, the busbar contributes reducing battery module cost, size and weight. Further, the configuration can be easily modified to fit various sizes of modules by simply manufacturing the busbar to a required dimension.

According to advantageous but optional aspects, such a busbar may incorporate one or more of the following features, considered alone or according to any technically allowable combination:

each conducting element comprises at least two connection terminals, comprising each a welding area configured to be welded to one respective electric pole of a cell, whereas the first insulating layer comprise openings, configured to allow the access to the welding area of each connection terminals, whereas the second conductive layer is arranged so that the second conductive layer does not prevent access to the openings of the first insulating layer.

For each conductive element:
two adjacent connection terminals are linked together by a linking member,
for two adjacent connection terminals, the conductive element comprises a notch, arranged between said two adjacent connection terminals,
each notch extends orthogonally to the main axis, so that each connection terminal is allowed to rotate, relatively to the linking member, along a rotation axis parallel to the main axis independently from the adjacent connection terminal.

The linking member further comprises at least one flexible portion, wherein:
each flexible portion extends orthogonally to the main axis and is aligned with a respective notch, each flexible portion separates the linking member in two adjacent linking portions,
each flexible portion is elastically deformable, so that each linking portion rotates, relatively to the adjacent linking portion, along a pivot axis that is aligned with the corresponding flexible portion.

The laminated busbar further comprises a bottom insulating layer, wherein:
the bottom insulating layer is laminated on the first conductive layer,
the bottom insulating layer comprises apertures, configured to allow the electrical connection the conducting elements to the corresponding electric poles.

The laminated busbar further comprises a top insulating layer, wherein:
the top insulating layer is laminated on the second conductive layer,
the top insulating layer comprises top apertures, configured to allow the access to each connection terminal.

The second conductive layer is made from a sheet of metal.

The second conductive layer has a surface, which overlaps more than 30% of a surface of the first conductive layer, preferably more than 50%, preferably still more than 75%.

The invention also concerns a module for an electrical battery, comprising a pack of prismatic electrical cells, wherein:
the cells are interconnected by a laminated busbar according to any one of the previous claims,
the cells are arranged in a row along the main axis,
each cell has an upper side with two electric poles having opposite polarities and being arranged on opposite sides of the longitudinal plane, the electric poles of each cell being in the median plane, with the upper side of each cell being oriented in the same direction,
the cells are arranged in at least two groups, with the same number of cells in each group, with a first group of cells and a last group of cells located at opposite ends of the row,
within the same group of cells, the electrical poles having the same polarity are arranged on the same side of the longitudinal plane,
for two adjacent groups of cells, the electric poles having the same polarity are arranged on opposite sides of the longitudinal plane.

Advantageously:
the module comprises an enclosure, configured to hold the cells, while the first connector and the third connector are arranged outside the enclosure, preferably next to each other.

The invention will be better understood, and other advantages thereof will appear more clearly, in light of the following description of three embodiments of a laminated busbar and of a battery module, provided solely as a non-limiting example and done in reference to the appended drawings, in which.

Embodiments of the present invention will now be described with reference to the drawings, wherein like reference numerals are used to refer to like elements throughout. It will be understood that the figures are not necessarily to scale.

A first embodiment of the invention is described with reference to FIG. 1 to FIG. 5.

Figure 1:
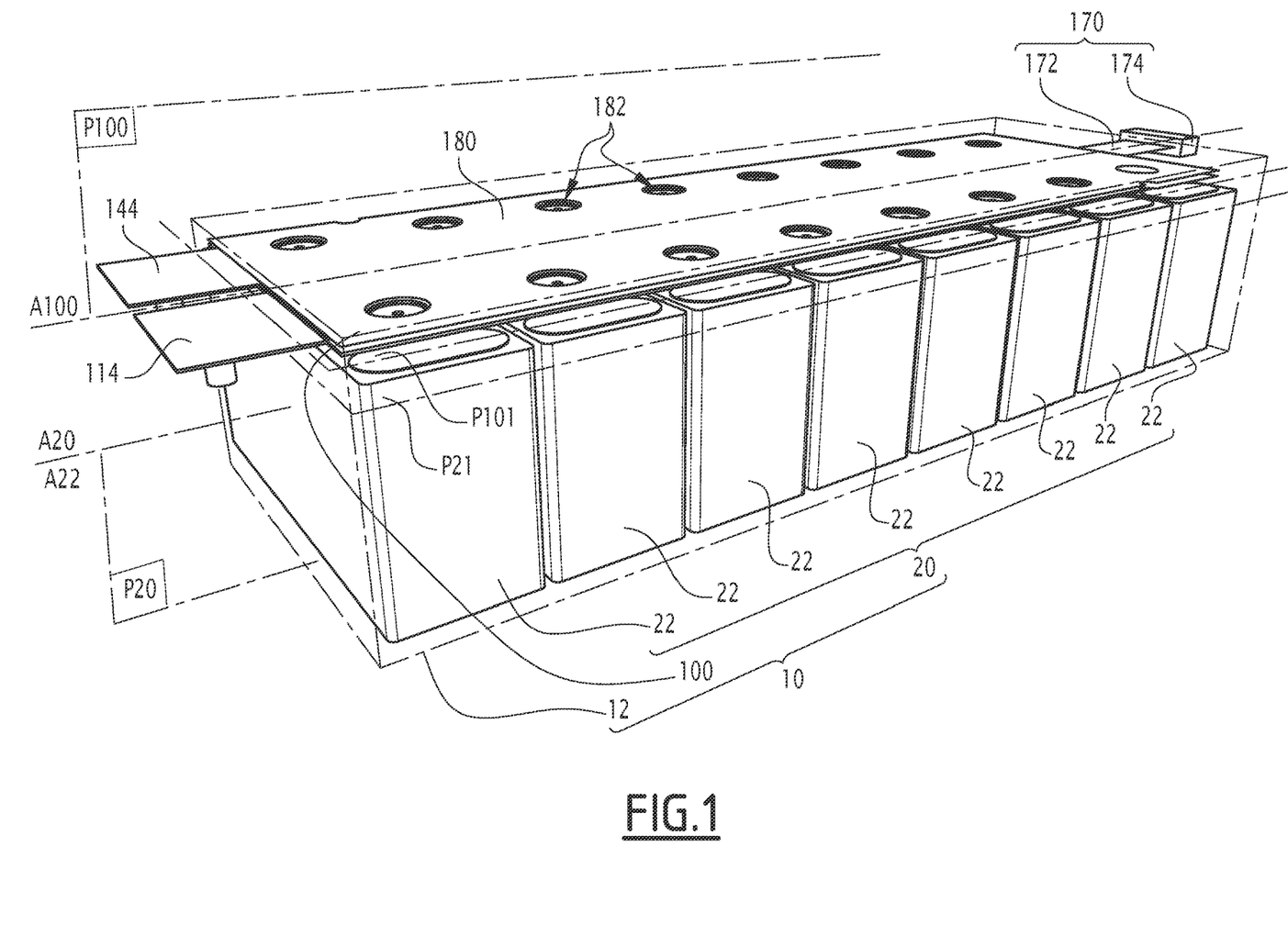
FIG. 1 is a perspective view of an exemplary module of prismatic cells, comprising a laminated busbar in accordance with a first embodiment of the invention.

A module 10 for an electrical battery is shown on FIG. 1. The electrical battery is for example used in mobile application such as automotive applications, for example to store electrical energy and supply electrical energy to a traction motor of an electric vehicle or an hybrid-electric vehicle. According to some embodiments, the electrical battery belongs to an electrical vehicle. The electrical battery comprises usually several modules 10, which are electrically connected together.

The module 10 comprises an enclosure 12, which is schematically represented by a box in mixed lines, a pack 20 of prismatic electrical cells 22 and a laminated busbar 100.

The pack 20 is located within the enclosure 12, which is configured to hold the cells 22, so that within a pack 20, the cells 22 are considered immobile relative to each other. The prismatic electrical cell 22 of the pack 20 are interconnected by the laminated busbar 100, as explained here-below. The laminated busbar 100 is also simply called "busbar 100" in short, while the prismatic electrical cells 22 are also simply called "cells 22" in short.

In the illustrated non-limiting example, the pack 20 comprises eight cells 22, although in other embodiments the number of cells 22 in each pack 20 could be different. Within the scope of this description, unless specified otherwise, a "cell 22" refers to a prismatic electrical cell 22. The cells 22 from to the same pack 20 have the same geometry, work the same way and are preferably identical to each other. What is explained for any of the cells 22 can be transposed to the other cells 22.

Figure 2:
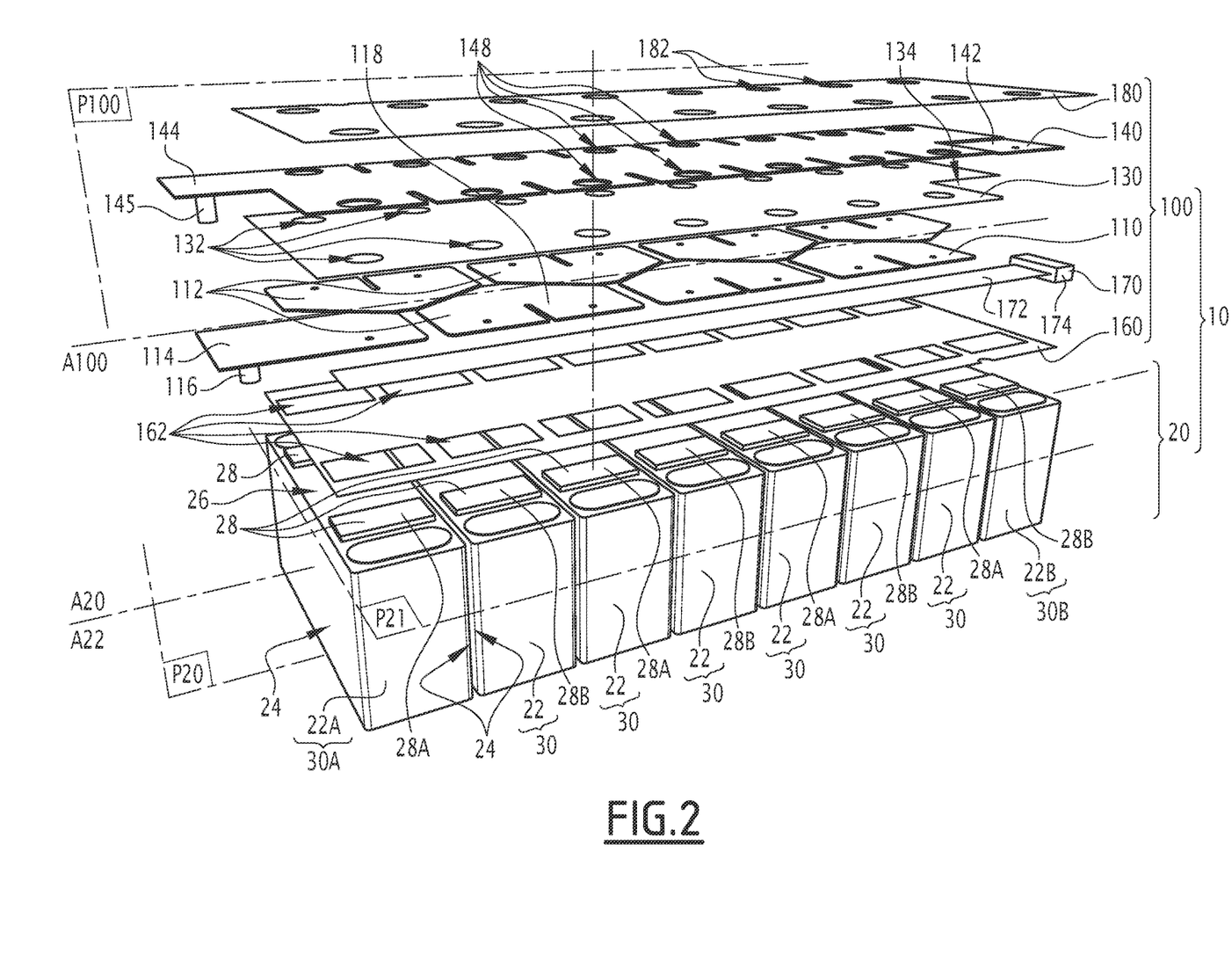
FIG. 2 is an exploded view of the module of FIG. 1.

An exploded view of the module 10 is shown on FIG. 2, the enclosure 12 being omitted. On FIG. 3, several elements of the busbar 100 are not shown and the pack 20 is more easily viewed.

Each cell 22 has a shape of a rectangular prism, with a rectangular cross-section projected along a cell axis A22. On the figures, the cell axis A22 is supposed to be horizontal. Each cell 22 has two lateral sides 24, which extend orthogonally to the cell axis A22 and are oriented opposite to each other.

Each cell 22 has an upper side 26 and two electric poles 28, which are arranged on the upper side 26. The two electric poles 28 include a first pole 28A and a second pole 28B that have opposite polarities and that are distinct from each other. The electric poles 28 are accessible for the connection with an external element, in particular for the connection with the busbar 100. In other words, the electric poles 28 of each cell 22 are configured to be electrically connected to the laminated busbar 100.

Within the pack 20, the cells 22 are stacked together along a longitudinal axis A20 of the pack 20. The cell axis A22 of each cell 22 is globally aligned with the longitudinal axis A20 and the upper side 26 of each cell 22 is oriented in the same direction as the other cells 22. For two adjacent cells 22, a lateral side 24 of a first of the two cells 22 faces a lateral side 24 of the other of the two cells 22.

In other words, within the pack 20, the cells 22 are arranged in a row along the longitudinal axis A20, and the pack 20 comprises a first cell 22A and a last cell 22B, the first and last cells 22A and 22B being arranged at two opposite extremities of the pack 20. On the FIGS. 1 to 3, the cell 22 at the extreme left side of the figures is considered to be the first cell 22A, while the cell 33 at the extreme right side of the figures is considered to be the last cell 22B.

For each cell 22 of the pack 20, the two electric poles 28 are arranged on opposite sides of a longitudinal plane P20 of the pack 20, the longitudinal plane P20 being vertical and parallel to the longitudinal axis A20.

The electric poles 28 are geometrically borne by a median plane P21 of the pack 20, the median plane P21 being parallel to the longitudinal axis A20 and orthogonal to the longitudinal plane P20. In the illustrated example, the upper side 26 of each cell 22 is supposed to be facing upwards, and the median plane P21 is horizontal.

Within the pack 20, the cells 22 are arranged in at least two groups 30 of cells 22, with the same number of cells 22 in each group 30. In the illustrated example, the groups 30 are connected to each other in serial. In the first embodiment of the invention, each group 30 comprises only one cell 22.

In other words, the pack 20 comprises eight groups 30 of one cell 22 each, and all the cells 22 are connected to each other in serial.

The group 30 that comprises the first cell 22A is also called first group 30A, and the group 30 that comprises the last cell 22B is also called last group 30B. In other words, the first group 30A and the last group 30B are located at opposite extremities of the pack 20. On FIGS. 1 to 3, the first group 30A is located on the left hand side, the last group 30B is located on the right hand side, and the first group 30A is separated from the last group 30B by six other groups 30.

Within the same group 30 of cells 22, the electrical poles 28 having the same polarity are arranged on the same side of the longitudinal plane P20. In other words, within the same group 30, the first poles 28A are arranged on one side of the longitudinal plane P20, and the second poles 28B are arranged on the other side of the longitudinal plane P20.

For two adjacent groups 30 of cells 22, the poles 28 having the same polarity are arranged on opposite sides of the longitudinal plane P20. In other words, for two adjacent groups 30 of cells 22, the first poles 28A of one of the two groups 30 and the first poles 28A of the other of the two groups 30 are arranged on opposite sides of the longitudinal plane P20.

Figure 3:
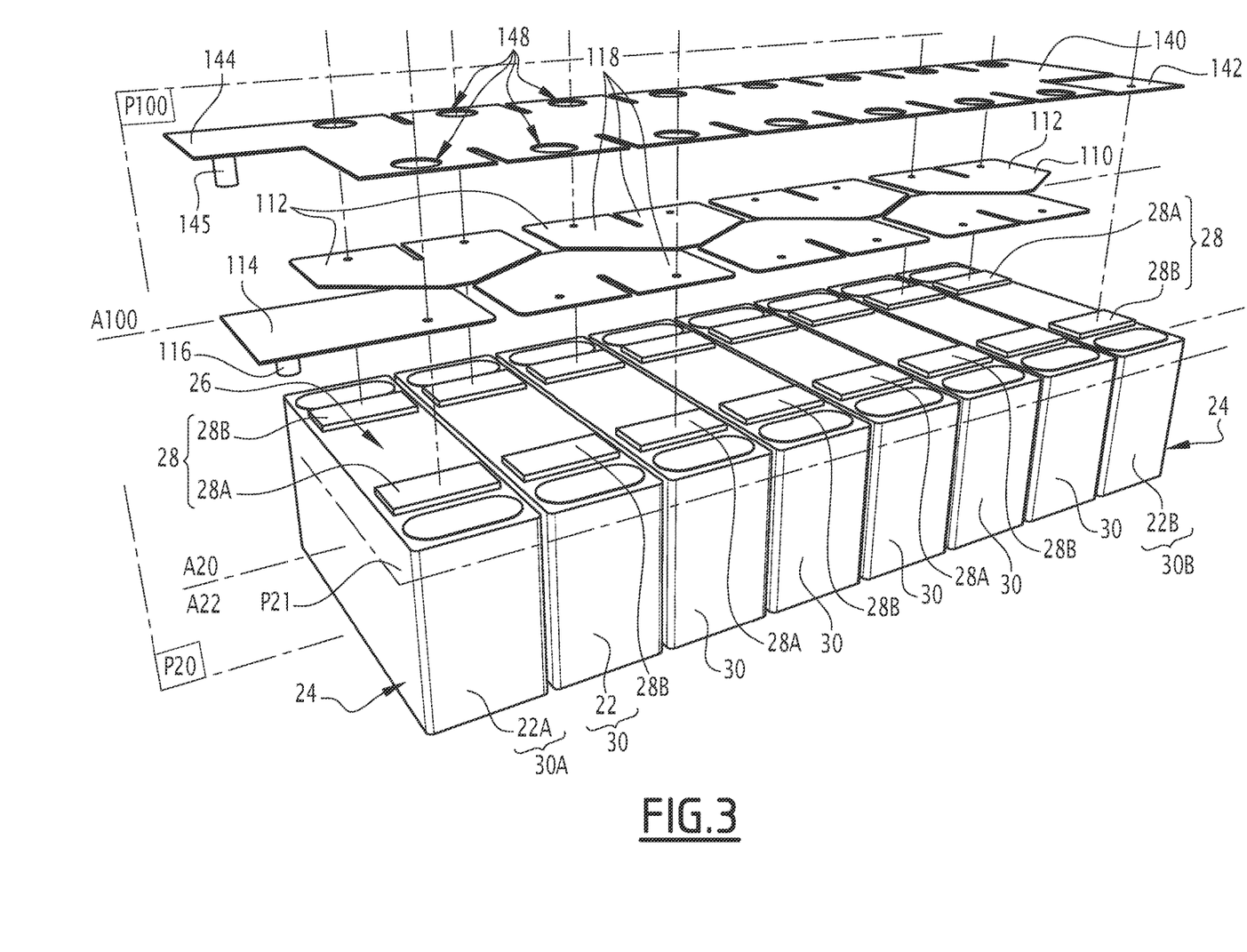
FIG. 3 is a view similar to FIG. 2, where several elements of the busbar are hidden and showing a first conductive layer and a second conductive layer of the busbar.

The laminated busbar 100 is now described, with reference to the FIGS. 1 to 3.

The laminated busbar 100 has an elongated and flat shape that extends along a main axis A100 and in a median plane P101. A longitudinal plane A100 of the busbar 100 is also defined for convenience, the longitudinal plane A100 is parallel to the main axis A100 and orthogonal to the medial plane P101. When the laminated busbar 100 is in a connected configuration with a pack 20, as illustrated on FIG. 1, the main axis A100 is parallel to the pack axis A20, the longitudinal plane P100 of the busbar 100 is sensibly coplanar with the longitudinal plane P20, and the median plane P101 of the busbar 100 is parallel to the median plane P21 of the pack 20.

The laminated busbar 100 comprises a first electrically conductive layer 110, a first electrically insulating layer 130, which is laminated on the first conductive layer 110, and a second electrically conductive layer 140, which is laminated onto the first insulating layer 130 and electrically separated from the first conductive layer 110 by the first insulating layer 130. The first conductive layer 110 is sandwiched between the first insulating layer 130 and the electric poles 28 when the laminated busbar 100 is connected to the pack of cells 20. Within the scope of the present description, the first insulating layer 130 and the other insulating layers, described later, are each made out of a material that is both flexible and electrically insulating, preferably a polymer material, for example polyester or polyimide. Each insulating layer has a thickness comprised between 25 μm and 250 μm.

Figure 4:
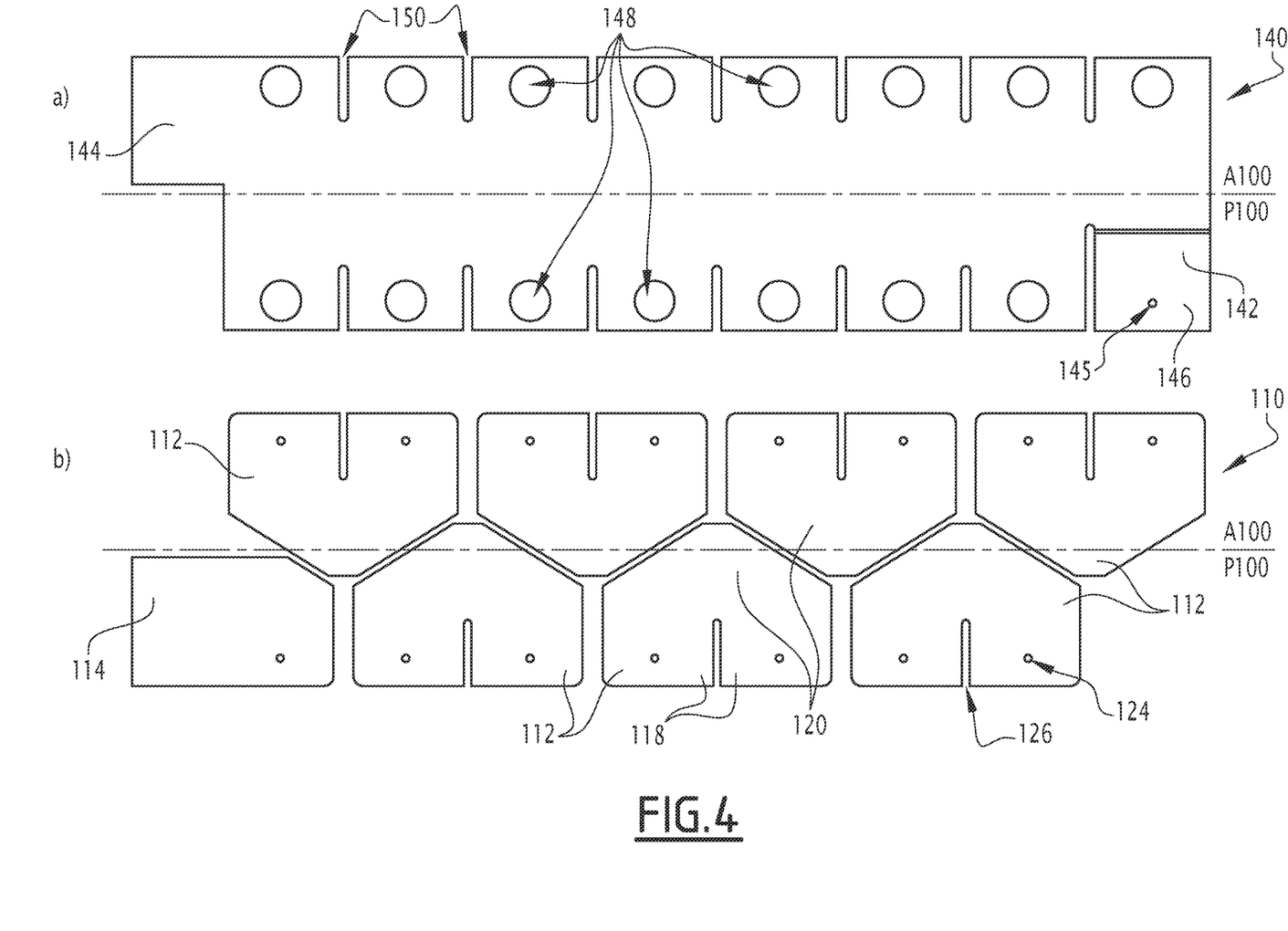
FIG. 4 shows, on two inserts a) and b), a top view of respectively the second conductive layer and the first conductive layer of the busbar.

A top view of the first conductive layer 110 is also shown on the insert b) of FIG. 4. The first electrically conductive layer 110 comprises at least one electrically conducting element 112, each conducting element 112 being configured to electrically connect the electric poles 28 belonging to respectively two adjacent groups 30 of cells, said electric poles 28 being located on the same side of the longitudinal plane P20.

The first conductive layer 110 also comprises a first electrical connector 114, configured to be connected to the electric poles 28 of the first group 30A of cells whose electric poles 28 are not connected to a conducting element 112 of the first conductive layer 110.

In the illustrated example, the pack 20 comprises eight groups 30 of cells 22, and the first conductive layer 110 comprises seven conducting elements 112. The first connector 114 is here connected to the first poles 28A of the first group 30A of cells 22.

Optionally, the first connector 114 comprises a mechanical interface 116, here a rivet, for the mechanical connection of the first connector 114 to an external element such as a busbar, not shown.

The conducting elements 112 of the first conductive layer 110 work the same way and have preferably the same shape, still preferably are identical to each other. One of the conducting element 112 is shown at higher scale on the insert b) of FIG. 5. What is described for one of the conducting elements 112 is valid for the other conducting elements 112.

Each conducting element 112 comprises at least two connection terminals 118, each configured to be connected to one electric pole 28 of a cell 22, and a linking member 120. Within a conducting element 112, two adjacent connection terminals 118 are linked together by the linking member 120. In the illustrated example, the linking member 120 has a triangular shape, while each connection terminal 118 has a rectangular shape.

In the illustrated non-limiting example, the connection terminals 118 of each conducting element 112 are arranged on the same side of the longitudinal plan P100 and are configured to be connected to the electric poles 28 that belong to two adjacent groups 30 of cells 22 and that are located on the same side of the longitudinal plan P20. The cells 22 being prismatic cells, the connection terminals 118 located on the same side of the longitudinal plane P100 are aligned with each other along a direction parallel to the longitudinal plane P100. Each linking members 120 straddles the longitudinal plane P100, and the connection terminals 118 are arranges apart the longitudinal plane P100.

Each connection terminal 118 comprises a welding area 122, which is configured to be welded to a respective electric pole 28. In the illustrated example, each connection terminal 118 comprises advantageously a centering hole 124, which is arranged in a central area of the connection terminal 118, while the welding area 122 extends around the centering hole 124. On FIG. 5 b), each welding area 122 is schematically represented by an ellipsis in doted line.

Each centering hole 124 is configured to allow, during the connection of the busbar 100 with the pack 20, visually checking that the welding area 122 is properly aligned with the corresponding electric pole 28 before the actual welding operation.

The welding process of a connection terminal 118 to a respective electric pole 28 is preferably laser welding. During the connection operation of a connection terminal 118 to a respective electric pole 28, the connection terminal 118 is first mechanically pressed onto the corresponding electric pole 28, in order to ensure a good electrical connection, then the welding itself is done.

In the illustrated example, the first insulating layer 130 and the electric poles 28 are located on opposite sides of the first conductive layer 110. The first insulating layer 130 comprise first openings 132, which are configured to allow the access to the welding area 124 of each connection terminals 118.

Because of manufacturing tolerance, the actual position of each electric poles 28 might deviate from the theoretical position, where each electric pole 28 is geometrically borne by the medial plane P21.

For each conducting element 112, two adjacent connection terminals 118 are linked together by the linking member 120, and the conducting element 112 comprises a notch 126, which is arranged between the two adjacent connection terminals 118.

Each notch 126 extends orthogonally to the main axis A100 and is configured to facilitate the elastic deformation of the conducting element 112, so that each connection terminal 118 is allowed to rotate, relatively to the linking member 120, along a rotation axis A118 parallel to the main axis A100 independently from the adjacent connection terminal 118.

Optionally, the linking member further comprises at least one flexible portion 128. The flexible portions 128 are here schematically represented by a fold with a hemi-circular section. Alternatively, the flexible portions 128 are flat, for example produced by stamping the conducting element 112.

Each flexible portion 128 separates the linking member 120 in two adjacent linking portions 130. Each flexible portion 128 extends orthogonally to the main axis A100 and is aligned with a respective notch 126. Each flexible portion 128 is elastically deformable, so that each linking portion 130 rotates, relatively to the adjacent linking portion 130, along a pivot axis A130 that is aligned with the corresponding flexible portion 128.

Thanks to the notch 126 arranged between two adjacent connection terminals 118 and thanks to the flexible portion 128 aligned with each notch 126, each conductive element 112 deforms elastically to accommodate the position deviations of the electrical poles 28 to which the busbar 100 is connected.

When the first conductive layer 110 is laminated onto the first insulating layer 130, the conducting elements 112 are laminated onto the first insulating layer 130 and do not overlap each other. The conductive elements 112 are preferably produced by cutting and/or stamping a single sheet of conductive material, for example a sheet of metal, before the lamination onto the first insulating layer, which is an efficient process.

The conducting elements 112 have a thickness that is thin enough so that the conductive elements 112 can be flexed during the welding process and accommodate the position deviations of the electric poles 28, but thick enough to cope with the density of electrical current when the module 10, within an electrical battery, is in use. In the illustrated embodiment, the conducting elements 112 have a thickness comprised between 0.25 mm and 2 mm.

As non-limiting examples, the conducting elements 112 are made out of metal, for example copper, or aluminum, or nickel, or one of their alloys. Preferably, the surface of the first conductive layer 110 is plated, for example to prevent oxidation, with a plating material such as tin, or nickel, or silver, or one of their alloys.

The second electrically conductive layer 140 extends along the main axis A100 and comprises two opposite extremities, with respectively a second electrical connector 142 and a third electrical connector 144. The second electrical connector 142 and the third electrical connector 144 are preferably connected by welding, for example laser welding, to the respective electric poles 28.

The second electrical connector 142 is configured to be connected to the electric poles 28 of the last group 30B of cells 22, whose electric poles 28 are not connected to a conducting element 112 of the first conductive layer 110.

In the example illustrated on FIG. 3, the second electrical connector 142 is connected to the second electrical poles 28B of the last cell 22B, while the first electrical poles 28A of the last cell 22B are connected to a conducting element 112.

The third electrical connector 144 is closer to the first connector 114 than the second electrical connector 142, while the third electrical connector 144 is configured to be connected, through the rest of the second conductive layer 140, to the electric poles 28 of the last group 30B of cells 22, whose electric poles 28 are not connected to a conducting element 112 of the first conductive layer 110.

Preferably, the third connector 144 is arranged next to the first connector 114, as in the illustrated example. In other words, the first connector 114 and the third connector 144 are arranged on the same side of the pack 20. The second conductive layer 140 is a return circuit of the busbar 100.

Thanks to the busbar 100 that includes, in a laminated structure, both the first conductive layer 110 and the second conductive layer 140, each electric pole 28 of the pack 20 can be connected, preferably by laser welding, in an automated way to the first or second conductive layer 110 or 140, which is very efficient. When the module 10 is assembled, as shown on FIG. 1, the first connector 114 and third connector 144 are advantageously arranged outside the enclosure 12, preferably next to each other. Each cell 22 of the module 10 may be connected through the busbar 100, which is very convenient.

Optionally, the third connector 144 comprises a mechanical interface 145, here a stud, for the mechanical connection of the first connector 114 to an external element such as a busbar, not shown.

The first insulating layer 130, sandwiched between the first conductive layer 110 and the second conductive layer 140, comprises a cut-out window 134, which has here a rectangular shape and which is configured to allow the electrical connection of the second electrical connector 142 with the corresponding electric poles 28 of the last group 30B of cells 22.

The second electrical connector 142 comprises at least one connection terminal 146, configured to be welded to a respective electrical pole 28. In the first embodiment, the second electrical connector 142 comprises one connection terminal 146.

Figure 5:
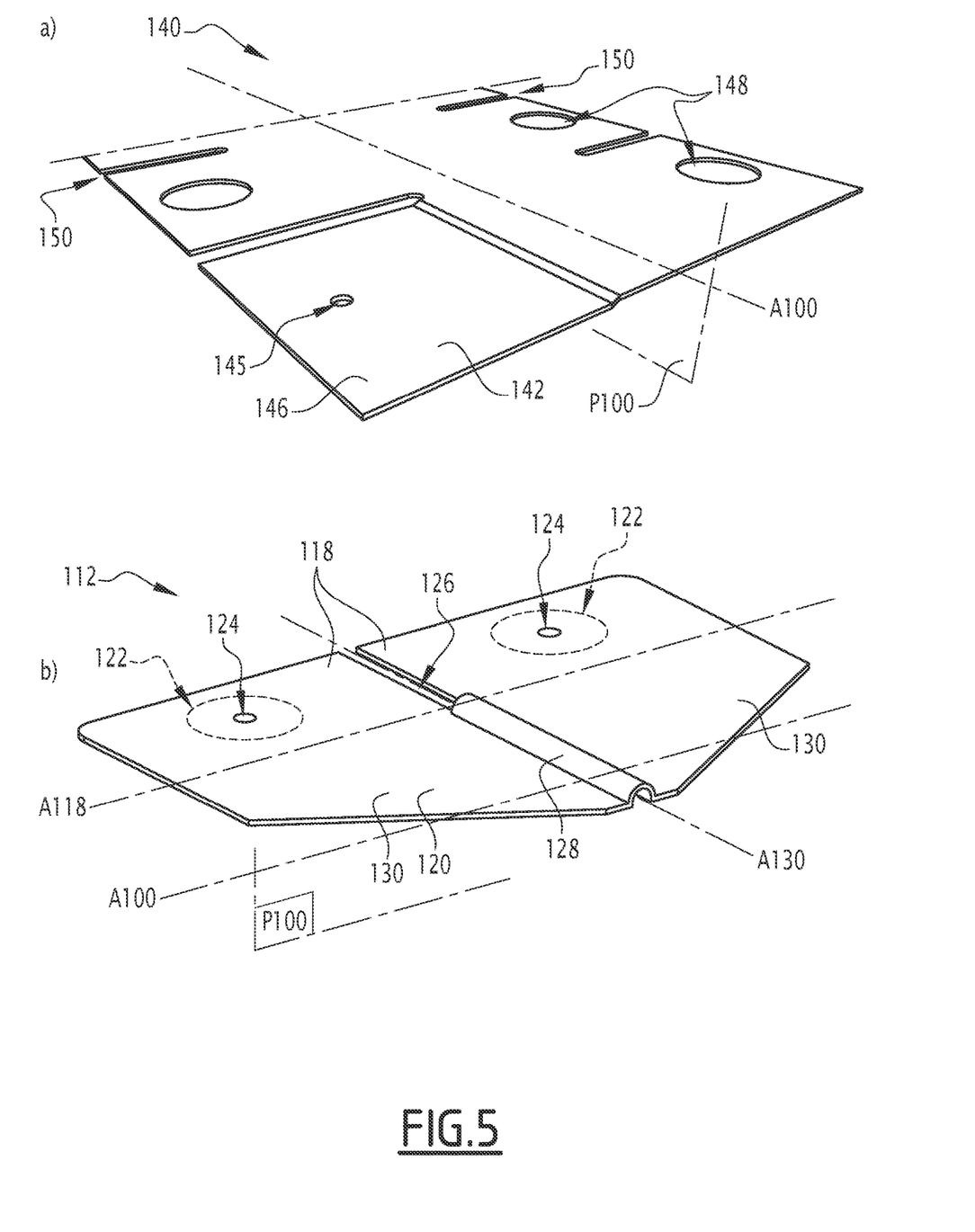
FIG. 5 shows, on two inserts a) and b), a perspective view of respectively a detail of the second conductive layer and of a conducting element of the first conductive layer.

As seen on FIG. 5 a), the connection terminal 146 of the second electrical connector 142 has a rectangular shape and comprises a centering hole 145, which is configured to allow, during the connection of the busbar 100 with the pack 20, visually checking that second electrical connector 142 is properly aligned with the corresponding electric pole 28 before the actual welding operation.

The second conductive layer 140 is made out of conductive material, preferably metal with a good electrical conductivity so as to avoid losses of electrical energy. As non-limiting examples, the second conductive layer 140 is made out of metal, for example copper, or aluminum, or nickel, or one of their alloys. Preferably, the surface of the second conductive layer 140 is plated to prevent oxidation, for example with tin, or nickel, or silver, or one of their alloys. The second conductive layer 140 is preferably made by cutting and/or stamping a sheet of metal.

When the module 10 is in use, either to store electrical energy within the cells 22 or to deliver electrical energy from the cells 22, the cells 22 and the conducting elements 112 have a tendency to heat-up. The second conductive layer 140, which is laminated on the first insulating layer 130, partially overlaps with the first conductive layer 110 and receives a part of the thermal energy of the first conductive layer 110. In other words. The second conductive layer 140 helps dissipating the thermal energy of the first conductive layer 110. In order for this dissipation effect to be stronger, the second conductive layer 140 has a surface, which overlaps more than 30% of a surface of the first conductive layer 110, preferably more than 50%, preferably still more than 75%.

The second conductive layer 140 has a thickness that is chosen, depending on the overlapping ratio of the second conductive layer 140 over the first conductive layer 110, to cope with the density of electrical current when the module 10, within an electrical battery, is in use. According to some examples, the second conductive layer 140 has a thickness comprised between 0.25 mm and 2 mm.

The second conductive layer 140 is arranged so that the second conductive layer 140 does not prevent access to the openings 132 of the first insulating layer 110. In the first embodiment, the second conductive layer 140 comprise second openings 148, which are configured to allow the access to the welding area 122 of each connection terminals 118. In the first embodiment of the busbar 100, the first conductive layer 110 and the second conductive layer 140 have sensibly the same width, measured orthogonally to the longitudinal plane P100, and the second openings 148 have a closed contour. In the illustrated example, each second opening 148 has a circular contour and is aligned, along an axis orthogonal to the median plane P101, with a respective centering hole 124.

In other words, the second openings 148 are aligned with the first openings 132 of the first insulating layer 130. The first openings 132 are preferably smaller than the second openings 148, in order to reduce the risk of short circuit through the first openings 132.

In the illustrated example, the second conductive layer 140 comprises additional notches 150, that are arranged between two adjacent openings 148 located on the same side of the longitudinal plane P100, each additional notch 150 extending orthogonally to the longitudinal plane P100 and being configured to improve the flexibility of the second conductive layer 140, and therefore the overall flexibility of the busbar 100.

As shown on FIG. 2, the laminated busbar 100 further comprises a bottom insulating layer 160, which extends along the medial plane P100 of the busbar 100 and which is laminated on the first conductive layer 110. In other words, the first conductive layer 110 is sandwiched between the first insulating layer 130 and the bottom insulating layer 160.

Preferably, the bottom insulating layer has extends substantially over the upper surface 26 of all the cells 22 of the pack 20. The bottom insulating layer 160 comprises apertures 162, configured to allow the electric connection of each electric pole 28 with the busbar 100.

Each aperture 162 has a profile similar to a profile of an electric pole 28, so that when the busbar 100 is placed on top of the pack 20, each electric poles 28 passes trough a respective aperture 162 and is directly in contact with the respective connection terminal 118 or the first connector 114 or the second connector 142. In the illustrated example, each electric pole 28 has a rectangular profile, and each aperture 162 has a the same rectangular profile.

When the busbar 100 is assembled to the pack 20, the bottom insulating layer 160 rests on the upper face 26 of the cells 22, while the conducting elements 112 are connected to the electric poles 28. The bottom insulating layer 160 comprises holes 162, configured to allow the electrical connection the conducting elements 112 to the electric poles 22 of the cells 22.

Preferably, the laminated busbar 100 includes further a monitoring circuit 170, which is configured to monitor operational states, for example temperature, of the electrical battery 10.

In the illustrated example, the monitoring circuit 170 comprises a sensing circuit 172, which has an elongated shape extending along the main axis A100, and a connector 174, which is connected to an extremity of the sensing circuit 172.

In use, the sensing circuit 172 extends over the upper side 26 of the cells 22. The sensing circuit 172 comprises sensors, preferably at least one sensor per cell 22, configured to monitor states of the cells 22 located in the immediate proximity of the sensing circuit 172.

The sensing circuit 172 extends preferably, along the main axis 100, from the first cell 22A to the last cell 22B, and are configured to monitor operational states of each cell 22 of the pack 20. For example, the sensors of the sensing circuit 172 are temperature sensors, and the monitoring circuit 170 is configured to monitor a temperature of each cell 22 of the pack 20.

The laminated busbar 100 advantageously comprises a top insulating layer 180, which extends along the medial plane P100 of the busbar 100 and which is laminated on the second conductive layer 140. In other words, the second conductive layer 140 is sandwiched between the first insulating layer 130 and the top insulating layer 180.

Preferably, the top insulating layer 180 covers substantially the upper surface 26 of all the cells 22 of the pack 20. The top insulating layer 180 comprises top apertures 182, configured to allow the access, during the welding of the busbar 100 to the electric pole 28, to each connection terminal 118 or first or second connector 114 or 144. In the illustrated example, each top aperture 182 has a circular shape, coaxial with a respective first opening 132.

In the illustrated example, the sensing circuit 172 is sandwiched between the first conductive layer 110 and the bottom conductive layer 160. For example, the sensing circuits 172 are laminated onto the bottom insulating layer 160 before the bottom insulating layer 160 is laminated onto the first conductive layer 110. Such assembly process can be automated and is efficient and low cost.

Alternatively, the sensing circuit 172 is sandwiched between the first conductive layer 110 and the first insulating layer 130, or between the first insulating layer 130 and the second conductive layer 140, or between the second conductive layer 140 and the top insulating layer 180.

More generally, the sensing circuit 172 is laminated on any layer of the busbar 100, for example sandwiched between two adjacent layers of the busbar 100, these two layers comprising one of the insulating layers 160, 130 or 180, and a corresponding conductive layer 110 or 140.

Figure 6:
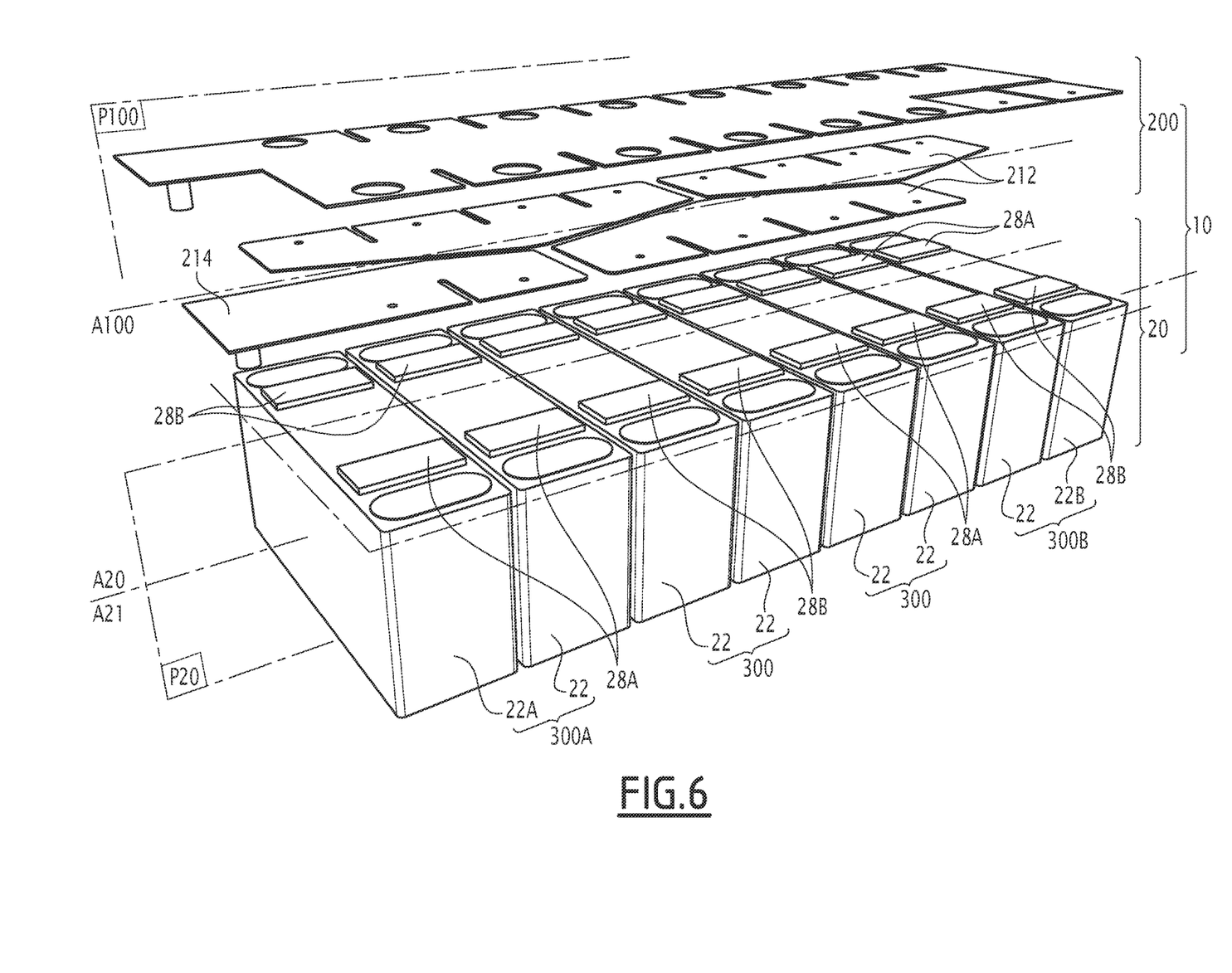
FIG. 6 is a perspective view, similar to FIG. 4, showing a first conductive layer and a second conductive layer of a busbar in accordance with a second embodiment of the invention.
Figure 7:
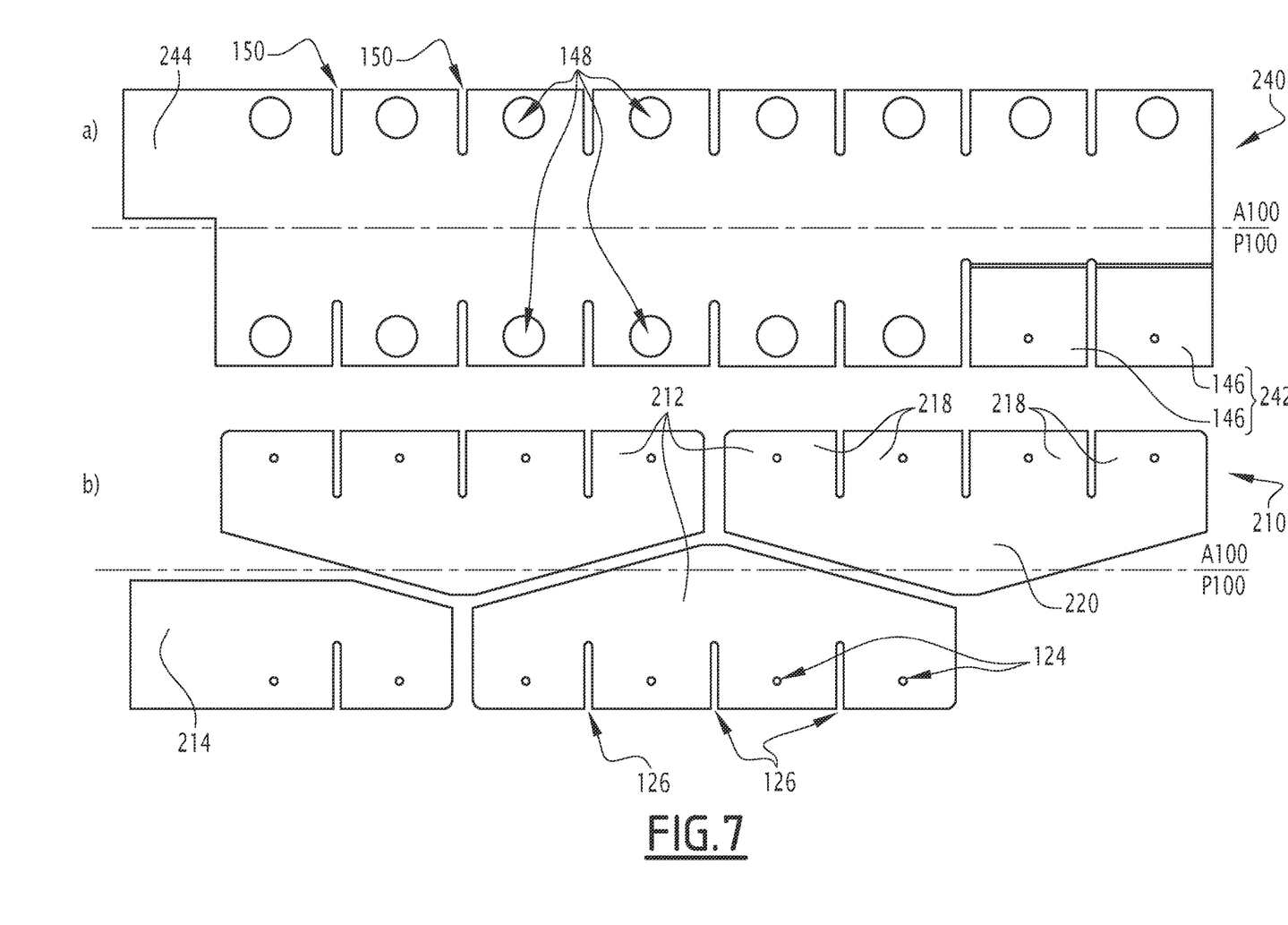
FIG. 7 is a view similar to FIG. 4 and shows, on two inserts a) and b), a top view of respectively the second conductive layer and the first conductive layer of the busbar in accordance to the second embodiment.

FIGS. 6 and 7 shows an alternative second embodiment of an electrical battery 10 according to the invention. In this second embodiment, the parts of the electrical battery that are identical or similar to the ones of the first embodiment have the same reference numerals. Here-after, mainly the differences between the first and second embodiments are detailed.

In the second embodiment of the invention, the cells 22 of the pack 20 are arranged in groups 300, each group 300 comprising two cells 22. The pack 20 comprises here four groups 300 of cells 22.

The group 300 that comprises the first cell 22A is also called first group 300A, and the group 300 that comprises the last cell 22B is also called last group 300B. In other words, the first group 300A and the last group 300B are located at opposite extremities of the pack 20. On FIG. 6, the first group 300A is located on the left hand side, the last group 300B is located on the right hand side, and the first group 300A is separated from the last group 300B by two other groups 300.

The electrical battery 10 comprises a laminated busbar 200.

The laminated busbar 200 has a laminated structure similar to the structure of the busbar 100 of the first embodiment, with conductive layers sandwiched between insulating layers. However only the conductive layers are shown on FIGS. 6 and 7.

The laminated busbar 200 comprises a first electrically conductive layer 210 and a second electrically conductive layer 240.

The first electrically conductive layer 210 comprises at least one electrically conducting element 212, each conducting element 212 being configured to electrically connect the electric poles 28 belonging to respectively two adjacent groups 300 of cells 22, said electric poles 28 being located on the same side of the longitudinal plane P20.

Each conducting element 212 comprises at least two connection terminals 118, each configured to be connected to one electric pole 28 of a cell 22, and a linking member 220. Since each group 300 comprises two cells 22, each conducting element 212 comprises four connection terminals 118, which are linked to the linking member 220.

More generally, the cells 22 belonging to the same group 300 are electrically connected to each other in parallel, while two adjacent groups 300 connected to each other by the same conducting element 212 are connected to each other in serial.

The first conductive layer 210 also comprises a first electrical connector 214, configured to be connected to the electric poles 28 of the first group 300A of cells whose electric poles 28 are not connected to a conducting element 212. Since each group 300 comprises two cells 22, including the first group 300A, the first connector 214 is configured to be connected to two electric poles 28.

The second conductive layer 240 extends along the main axis A100 and comprises two opposite extremities with respectively a second electrical connector 242 and a third electrical connector 244.

The second electrical connector 242 is configured to be connected to the electric poles 28 of the last group 300B of cells 22, whose electric poles 22 are not connected to a conducting element 212 of the first conductive layer 210, while the third electrical connector 244 is closer to the first connector 214 than the second electrical connector 242.

In the second embodiment, each group 300 of cells 22, including the last group 300B, comprises two cells 22. The second connector 242 is configured to be connected to two electric poles 28, and for this purpose comprises two connection terminals 146.

In the second embodiment, the first conductive layer 210 and the second conductive layer 240 have sensibly the same width, measured orthogonally to the longitudinal plane P100, and the second openings 148 have a closed contour, here a circular contour, each second opening 148 being aligned, along an axis orthogonal to the median plane P101, with a respective centering hole 124.

Figure 8:
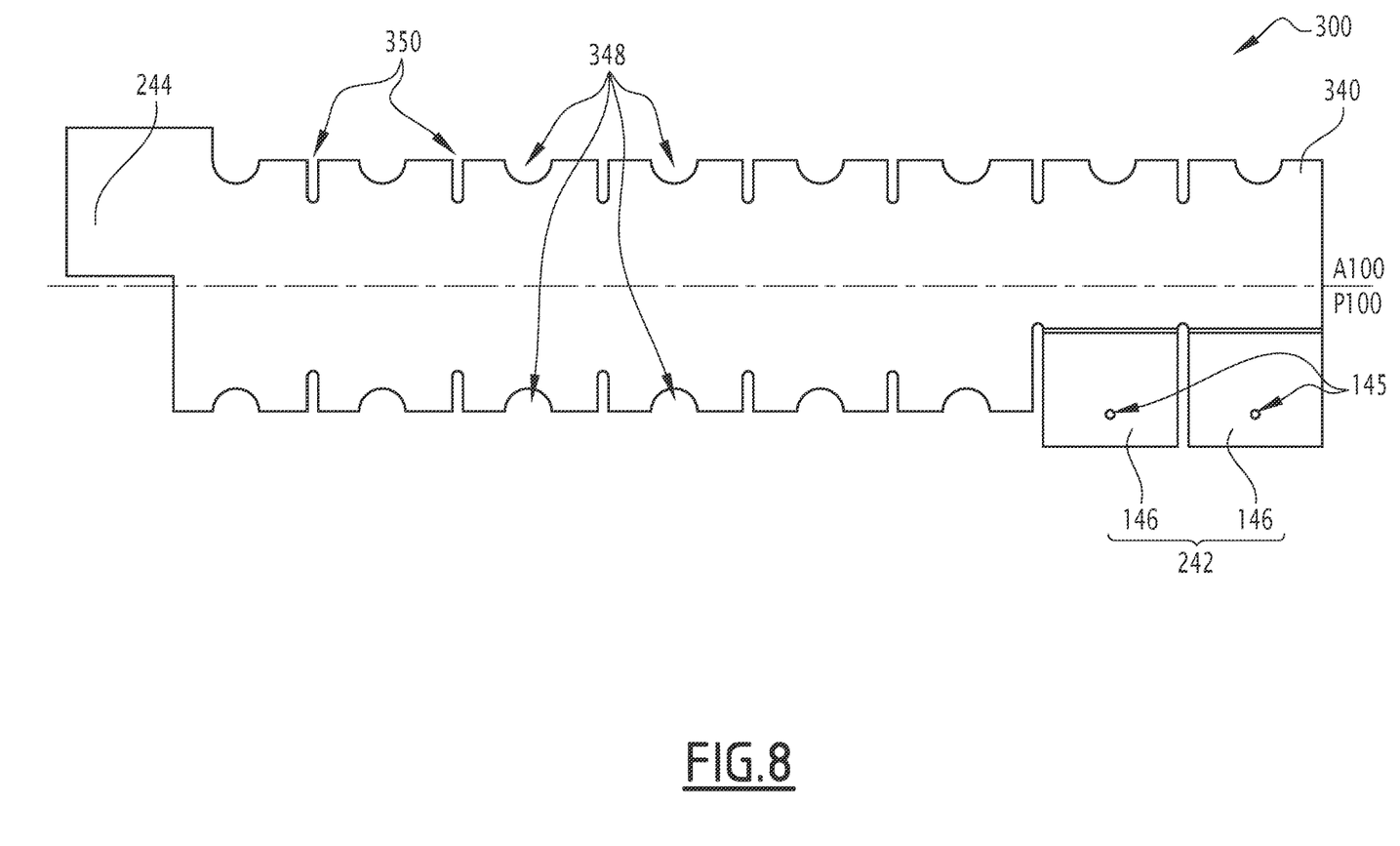
FIG. 8 is a top view of an exemplary second conductive layer in accordance with a third embodiment of the invention.

A busbar 300 according to a third embodiment of the invention is shown on FIG. 8. The busbar 300 comprises a second conductive layer 340, while the other components of the busbar 300, not shown, are considered identical to those of the busbar 200 of the second embodiment.

The second conductive layer 340 extends along the main axis A100 and comprises two opposite extremities with respectively a second electrical connector 242 and a third electrical connector 244.

In the third embodiment, the second conductive layer 340 has a width, measured orthogonally to the longitudinal plane P100, sensibly equal to 70% of the width of the second conductive layer 240 of the second embodiment.

When the busbar 300 is assembled, the second conductive layer 340 overlaps roughly 70% of the first conductive layer, so that the busbar 300 is lighter compared to the busbar 200 of the second embodiment, while maintaining a good thermal dissipation effect through the second conductive layer 340.

The second conductive layer 340 is arranged so that the second conductive layer 340 does not prevent access to the openings of the first insulating layer. In the third embodiment, the second conductive layer 340 comprise second openings 348, which are configured to allow the access to the first conductive layer during the welding operation. Because of the width reduction of the second conductive layer 340, each second opening 148 has an open contour, here a half-circular contour. Two adjacent second openings 348 are separated by a additional notch 350, which is shorter than the additional notch 150 of the previous embodiments.

Figure 9:
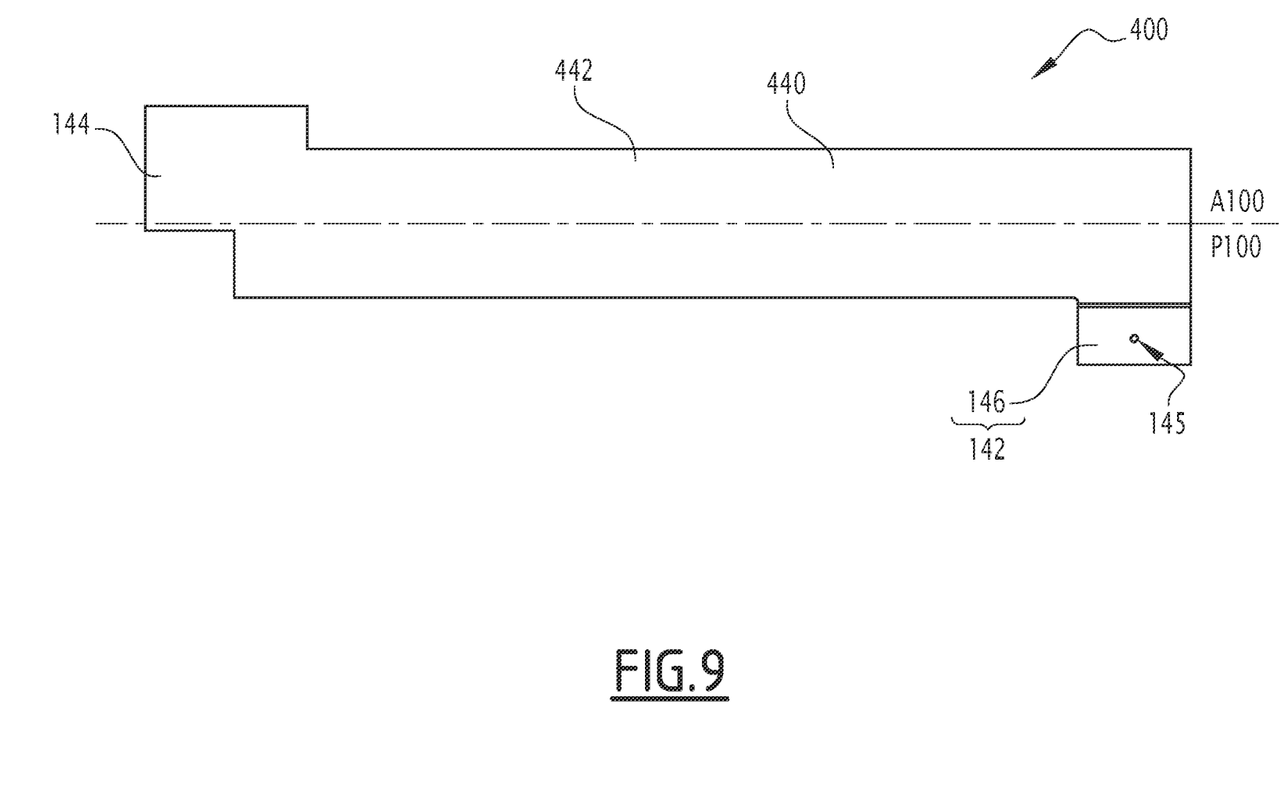
FIG. 9 is a top view of an exemplary second conductive layer in accordance with a fourth embodiment of the invention.

A busbar 400 according to a fourth embodiment of the invention is shown on FIG. 9. The busbar 400 comprises a second conductive layer 440, while the other components of the busbar 400, not shown, are considered identical to those of the busbar 100 of the first embodiment.

The second conductive layer 440 comprises a central portion 442, to which the second electrical connector 142 and the third electrical connector 144 are attached. The second conductive layer 440 is arranged so that the second conductive layer 440 does not prevent access to the openings 132 of the first insulating layer 110. More precisely, in the fourth embodiment, the second conductive layer 440 does not comprise openings, such as the second openings 148 or 348 of the previous embodiments, but the central portion 442 has a straight shape, which is easier to produce.

More generally, the shape and contour of the second conductive layer can be altered according to the design requirements, with a straight profile or including openings. Second openings 148 or 348 and additional notches 150 or 350 can be altered and/or combined and/or omitted, while keeping in mind the constraints of electrical conductivity, thermal conductivity, and reduced mass.

The respective features of the different embodiments and variants of the module 10 and of the busbar 100 considered in this description can be combined.

The invention claimed is:

1. A laminated busbar for interconnecting a pack of prismatic electrical cells in a module from an electrical battery, wherein:
the laminated busbar has an elongated and flat shape that extends along a main axis and in a median plane,
the pack of electrical cells is configured so that:
the electrical cells are configured to be arranged in a row along the main axis,
each cell has an upper side with two electric poles having opposite polarities and being arranged on opposite sides of a longitudinal plane, which is parallel to the main axis and orthogonal to the median plane, the electric poles of each cell being arranged in the median plane, with the upper side of each cell being oriented in the same direction,
the cells are arranged in at least two groups, with the same number of electrical cells in each group, with a first group of cells and a last group of cells located at opposite ends of the pack,
within the same group of cells, the electric poles having the same polarity are arranged on the same side of the longitudinal plane,
for two adjacent groups of cells, the electric poles having the same polarity are arranged on opposite sides of the longitudinal plane,
the laminated busbar comprises:
a first electrically conductive layer, comprising at least one electrically conducting element, each conducting element being configured to electrically connect the electric poles of two adjacent groups of cells, said electric poles being located on the same side of the longitudinal plane,
a first electrically insulating layer, which is laminated on the first conductive layer,
a first electrical connector, configured to be connected to the electric poles of the first group of cells whose electric poles are not connected to a conducting element of the first conductive layer,
and wherein:
the laminated busbar further comprises a second electrically conductive layer, which extends along the main axis and comprises two opposite extremities with respectively a second electrical connector and a third electrical connector,
the second conductive layer is laminated onto the first insulating layer and electrically separated from the first conductive layer by the first insulating layer, the first conductive layer being sandwiched between the first insulating layer and the electric poles when the laminated busbar is connected to the pack of cells,
the second electrical connector is configured to be connected to the electric poles of the last group of cells, whose electric poles are not connected to a conducting element of the first conductive layer, while the third electrical connector is closer to the first electrical connector than to the second electrical connector, and
the first insulating layer comprises a cut-out window, configured to allow the electrical connection of the second electrical connector with the corresponding electric poles of the last group of cells.

2. The laminated busbar according to claim 1, wherein:
each conducting element comprises at least two connection terminals, comprising each a welding area configured to be welded to one respective electric pole of a cell,
the first insulating layer comprise openings, configured to allow the access to the welding area of each connection terminals, and
the second conductive layer is arranged so that the second conductive layer does not prevent access to the openings of the first insulating layer.

3. The laminated busbar according to claim 2, wherein, for each conductive element:
two adjacent connection terminals are linked together by a linking member,
for two adjacent connection terminals, the conductive element comprises a notch, arranged between said two adjacent connection terminals, and
each notch extends orthogonally to the main axis, so that each connection terminal is allowed to rotate, relatively to the linking member, along a rotation axis parallel to the main axis independently from the adjacent connection terminal.

4. The laminated busbar according to claim 3, wherein:
the linking member further comprises at least one flexible portion,
  each flexible portion extends orthogonally to the main axis and is aligned with a respective notch, each flexible portion separates the linking member in two adjacent linking portions, and
  each flexible portion is elastically deformable, so that each linking portion rotates, relatively to the adjacent linking portion, along a pivot axis that is aligned with the corresponding flexible portion.

5. The laminated busbar according to claim 1, further comprising a bottom insulating layer, wherein:
the bottom insulating layer is laminated on the first conductive layer, and
the bottom insulating layer comprises apertures, configured to allow the electrical connection the conducting elements to the corresponding electric poles.

6. The laminated busbar according to claim 1, further comprising a top insulating layer, wherein:
the top insulating layer is laminated on the second conductive layer, and
the top insulating layer comprises top apertures, configured to allow the access to each connection terminal.

7. The laminated busbar according to claim 1, wherein the second conductive layer is made from a sheet of metal.

8. The laminated busbar according to claim 7, wherein:
the second conductive layer has a surface, which overlaps more than 30% of a surface of the first conductive layer.

9. The laminated busbar according to claim 7, wherein the second conductive layer has a surface, which overlaps more than 50% of a surface of the first conductive layer.

10. The laminated busbar according to claim 7, wherein the second conductive layer has a surface, which overlaps more than 75% of a surface of the first conductive layer.

11. A module for an electrical battery, comprising a pack of prismatic electrical cells, wherein:
the cells are interconnected by a laminated busbar according to claim 1,
the cells are arranged in a row along the main axis,
each cell has an upper side with two electric poles having opposite polarities and being arranged on opposite sides of the longitudinal plane, the electric poles of each cell being arranged in the median plane, with the upper side of each cell being oriented in the same direction,
the cells are arranged in at least two groups, with the same number of cells in each group, with a first group of cells and a last group of cells located at opposite ends of the row,
within the same group of cells, the electrical poles having the same polarity are arranged on the same side of the longitudinal plane, and
for two adjacent groups of cells, the electric poles having the same polarity are arranged on opposite sides of the longitudinal plane.

12. The module according to claim 11, wherein:
the module comprises an enclosure, configured to hold the cells, and
the first connector and the third connector are arranged outside the enclosure.

13. The module according to claim 12, wherein the first connector and the third connector are arranged next to each other.

* * * * *